US007602268B2

(12) United States Patent
Miyasaka et al.

(10) Patent No.: US 7,602,268 B2
(45) Date of Patent: Oct. 13, 2009

(54) OPERATION INPUT DEVICE AND ELECTRONIC EQUIPMENT EMPLOYING THE SAME

(75) Inventors: Takeshi Miyasaka, Ritto (JP); Kazuaki Miyoshi, Ritto (JP)

(73) Assignee: OMRON Corporation, Kyoto (JP)

( * ) Notice: Subject to any disclaimer, the term of this patent is extended or adjusted under 35 U.S.C. 154(b) by 33 days.

(21) Appl. No.: 11/396,828

(22) Filed: Apr. 3, 2006

(65) Prior Publication Data
US 2006/0278011 A1     Dec. 14, 2006

(30) Foreign Application Priority Data
Apr. 1, 2005  (JP)  .............................. 2005-106126

(51) Int. Cl.
    *H01H 9/00* (2006.01)
(52) U.S. Cl. ...................... 335/205; 335/206; 335/207; 335/272; 335/302; 335/303
(58) Field of Classification Search ......... 335/205–207, 335/272, 302–303
    See application file for complete search history.

(56) References Cited

U.S. PATENT DOCUMENTS

| 4,516,177 | A | * | 5/1985 | Moon et al. ............... 360/77.07 |
| 4,806,837 | A | * | 2/1989 | Ito ............................. 318/653 |
| 5,057,807 | A | * | 10/1991 | Longly et al. ................ 335/207 |
| 5,592,079 | A | * | 1/1997 | Scheel .................... 324/207.25 |
| 5,990,772 | A | * | 11/1999 | Van Zeeland ............... 335/207 |
| 6,130,593 | A | * | 10/2000 | Van Zeeland ............... 335/205 |
| 6,262,646 | B1 | * | 7/2001 | Van Zeeland ............... 335/205 |
| 6,369,692 | B1 | * | 4/2002 | Van Zeeland ............... 338/200 |

(Continued)

FOREIGN PATENT DOCUMENTS

CN          2519328 Y        10/2002

(Continued)

OTHER PUBLICATIONS

Patent Abstracts of Japan, Publication No. 2003-280799, Publication Date: Oct. 2, 2003, 1 page.

(Continued)

*Primary Examiner*—Elvin G Enad
*Assistant Examiner*—Mohamad A Musleh
(74) *Attorney, Agent, or Firm*—Osha • Liang LLP

(57) ABSTRACT

An operation input device includes a base, a printed circuit board which has a plurality of pushbutton switches and Hall elements mounted on its upside and which is stacked on and united with the base, an operation plate which is supported on the base so as to be vertically movable on the printed circuit board, and a disc type operation dial in which an annular magnet with N-poles and S-poles arranged alternately is assembled on the underside of this operation dial and which is turnably assembled on the upside of the operation plate. Here, the disc type operation dial is turned, thereby to sense the changes of the magnetic fluxes of the annular magnet by the Hall elements and to detect a turning direction, while the disc type operation dial is depressed, thereby to operate any of the pushbutton switches through the operation plate. The operation dial is prevented from becoming rickety in a horizontal direction, and it ensures a smooth turning operation, thereby to afford a good operation feeling.

8 Claims, 18 Drawing Sheets

U.S. PATENT DOCUMENTS

| | | | |
|---|---|---|---|
| 6,542,058 B2* | 4/2003 | Van Zeeland | 335/205 |
| 7,057,601 B2* | 6/2006 | Wang | 345/156 |
| 7,126,072 B2* | 10/2006 | Saitoh | 200/512 |
| 2001/0026203 A1* | 10/2001 | Van Zeeland | 335/205 |
| 2004/0170270 A1* | 9/2004 | Takashima et al. | 379/363 |
| 2004/0233159 A1* | 11/2004 | Badarneh | 345/156 |
| 2005/0068134 A1* | 3/2005 | Nishino et al. | 335/207 |
| 2005/0068135 A1* | 3/2005 | Nishino et al. | 335/207 |
| 2005/0077988 A1* | 4/2005 | Van Zeeland et al. | 335/205 |
| 2006/0001512 A1* | 1/2006 | Garcia et al. | 335/205 |
| 2006/0278011 A1* | 12/2006 | Miyasaka et al. | 73/753 |
| 2006/0284710 A1* | 12/2006 | Takatsuka et al. | 335/205 |
| 2007/0120325 A1* | 5/2007 | Miyoshi et al. | 277/304 |

FOREIGN PATENT DOCUMENTS

| | | |
|---|---|---|
| EP | 1 394 666 A | 3/2004 |
| JP | 2000-182477 A | 6/2000 |
| JP | 2002-197947 A | 7/2002 |
| JP | 2003-141972 A | 5/2003 |
| JP | 2003-280799 | 10/2003 |
| JP | 2003-296006 A | 10/2003 |
| WO | 03/090008 A2 | 10/2003 |

OTHER PUBLICATIONS

Chinese Office Action issued in Chinese Application No. 2006100719477 mailed on May 18, 2007 and partial English translation thereof, 9 pages.

Patent Abstracts of Japan, Publication No. 2003-296006, Publication Date: Oct. 17, 2003, 1 page.

Patent Abstracts of Japan, Publication No. 2003-141972, Publication Date: May 16, 2003, 1 page.

Patent Abstracts of Japan, Publication No. 2002-197947, Publication Date: Jul. 12, 2002, 1 page.

Japanese Office Action issued in Japanese Application No. 2005-106126 mailed on Nov. 6, 2007 and English translation thereof, 6 pages.

European Search Report issued in European Application No. 06 11 1491 mailed Jul. 23, 2008, 9 pages.

* cited by examiner

OPERATION INPUT DEVICE AND ELECTRONIC EQUIPMENT EMPLOYING THE SAME

BACKGROUND OF THE INVENTION

1. Field of the Invention

The present invention relates to an operation input device which is applicable to a portable telephone or a portable music player.

2. Description of the Related Art

Heretofore, an operation input device for use in a portable telephone or the like has been, for example, one including a base, a printed circuit board which has a plurality of pushbutton switches and magnetic field detecting elements mounted on its upside and which is stacked on and united with the base, an operation plate which is placed on the printed circuit board, and a disc type operation dial in which an annular magnet with N-poles and S-poles arranged alternately is assembled on the underside of the operation dial and which is turnably assembled on the operation plate. With the operation input device, the operation dial is turned, whereby the changes of the magnetic fluxes of the annular magnet are sensed by the magnetic field detecting elements so as to detect a turning direction, while the operation dial is depressed, whereby the pushbutton switch is operated (refer to JP-A-2003-280799).

The operation input device is schematically shown in FIG. 19. As seen from the figure, the peripheral edge of a rotary member (operation dial) 154 is retained through a retaining ring 164 which is mounted on a base 120. Here, the rotary member (operation dial) 154 is subjected to a turning operation and a depressing operation, thereby to drive any of pushbutton switches not shown. In this case, when the upper peripheral edge of the rotary member 154 abuts against the retaining ring 164 in depressing the peripheral edge of this rotary member 154, an operation feeling worsens, and hence, some gap G1 is provided. Due to the provision of the gap G1, however, the rotary member 154 becomes rickety in a vertical direction. It is therefore considered to urge the rotary member 154 upwards by elastic members. With such a configuration, however, the retaining ring 164 and the upper peripheral edge of the rotary member 154 come into touch, and a friction develops in subjecting the rotary member 154 to the turning operation. This leads to the problem that a smooth turning operation is not attained.

SUMMARY OF THE INVENTION

In view of the problem mentioned above, the present invention has for its object to provide an operation input device of good operation feeling, which removes the vertical ricketiness of an operation dial and ensures a smooth turning operation.

In order to accomplish the object, an operation input device according to the invention consists in comprising a base, a printed circuit board which has a plurality of pushbutton switches and magnetic field detecting elements mounted on its upside and which is stacked on and united with the base, an operation plate which is supported on the base so as to be vertically movable on the printed circuit board, and a disc type operation dial in which an annular magnet with N-poles and S-poles arranged alternately is assembled on an underside of the operation dial and which is turnably assembled on an upside of the operation plate; wherein the disc type operation dial is turned, thereby to sense changes of magnetic fluxes of the annular magnet by the magnetic field detecting elements and to detect a turning direction, while the disc type operation dial is depressed, thereby to operate any of the pushbutton switches through the operation plate.

In the invention, a depressing operation function is allotted to the operation plate which is supported on the base so as to be vertically movable, while a turning operation function is allotted to the operation dial which is turnably assembled on the upside of the operation plate. Therefore, the vertical ricketiness can be eliminated, and a smooth turning operation is permitted, so that the operation input device of good operation feeling is obtained.

As an embodiment according to the invention, the outer peripheral edge parts of a slide sheet which is arranged between the operation plate and the disc type operation dial are supported by the base, thereby to bestow urging forces on the operation plate.

According to this embodiment, the slide sheet urges the operation plate downwards, so that the vertical ricketiness of the operation plate can be prevented more reliably, and the operation feeling is enhanced.

In the invention, an operation input device may well comprise a base, a printed circuit board which has a plurality of pushbutton switches and magnetic field detecting elements mounted on its upside and which is stacked on and united with the base, an operation plate which is arranged on the printed circuit board, a disc type operation dial in which an annular magnet with N-poles and S-poles arranged alternately is assembled on an underside of the operation dial and which is turnably assembled on an upside of the operation plate, and a flexible slide sheet which is arranged between the operation plate and the disc type operation dial and whose outer peripheral edge parts are supported by the base; wherein the disc type operation dial is turned, thereby to sense changes of magnetic fluxes of the annular magnet by the magnetic field detecting elements and to detect a turning direction, while the disc type operation dial is depressed, thereby to operate any of the pushbutton switches through the operation plate.

According to the invention, the operation plate is supported through the flexible slide sheet supported on the base. Here, a depressing operation function is allotted to the slide sheet and the operation plate, while a turning operation function is allotted to the operation dial which is turnably assembled on the upside of the operation plate. Therefore, the vertical ricketiness can be eliminated, and a smooth turning operation is permitted, so that the operation input device of good operation feeling is obtained.

As an embodiment according to the invention, the operation plate may well have its underside pushed up by elastic arms cut and raised from the base, thereby to be urged upwards.

According to this embodiment, the operation plate is pushed upwards, so that superfluous loads do not act on the pushbutton switches, and any maloperation can be prevented. Moreover, since the operation plate need not be pushed up by elastic arms being separate members, the number of components and the number of assembling man-hour are small, and the operation input device of high productivity is obtained.

As another embodiment according to the invention, elastic pads may well be arranged between the pushbutton switches and the operation plate.

According to this embodiment, the compressed elastic pads urge the operation plate upwards, and the vertical ricketiness can be prevented. Moreover, since the elastic pads absorb an assemblage error, a high assemblage precision is not required, and the fabrication of the operation input device is facilitated.

An electronic equipment according to the invention consists in that the operation input device mentioned above is mounted with the disc type operation dial exposed so as to be operable from outside.

According to the invention, there is the advantage that the electronic equipment which is capable of a smooth turning operation without vertical ricketiness is obtained.

DESCRIPTION OF THE PREFERRED EMBODIMENTS

Figure 1:
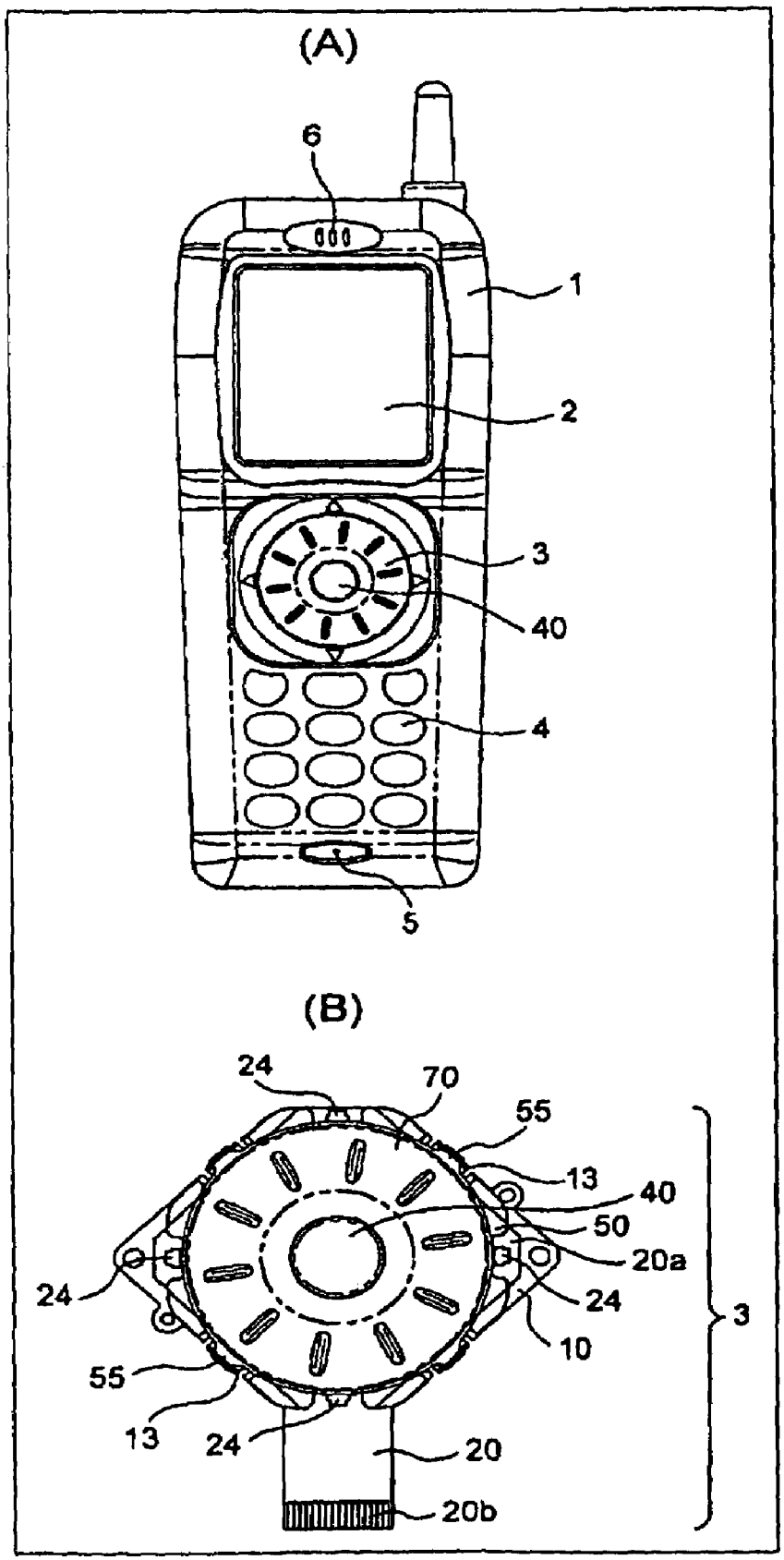
FIG. 1A is a front view of a portable telephone in which the first embodiment of an operation input device according to the present invention is incorporated.
FIG. 1B is an enlarged front view of the operation input device.
Figure 2:
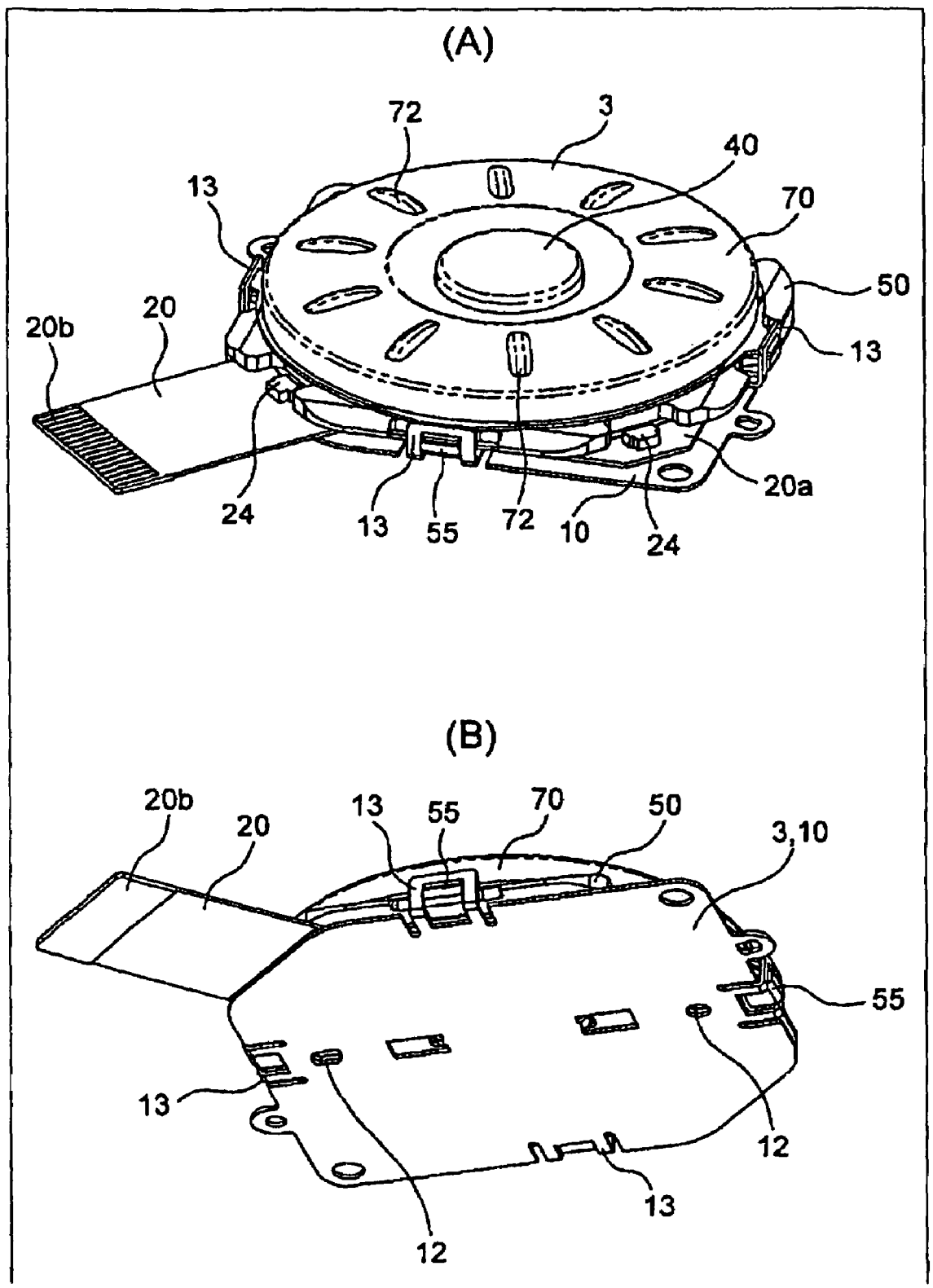
FIGS. 2A and 2B are perspective views in which the operation input device shown in FIGS. 1A and 1B is seen from above and from below, respectively.

Embodiments of an operation input device according to the present invention will be described in conjunction with the accompanying drawings of FIG. 1A through FIG. 18.

The operation input device in each embodiment is applied to a portable telephone. As shown in FIGS. 1A and 1B, a scroll bar (not shown) within a monitor 2 disposed in the portable telephone 1 is scrolled by the operation input device 3, whereby a selection instruction can be given through a pushbutton 40, etc. to be stated below. Incidentally, numeral 4 designates ten-keys, numeral 5 a microphone, and numeral 6 a loudspeaker.

Figure 4:
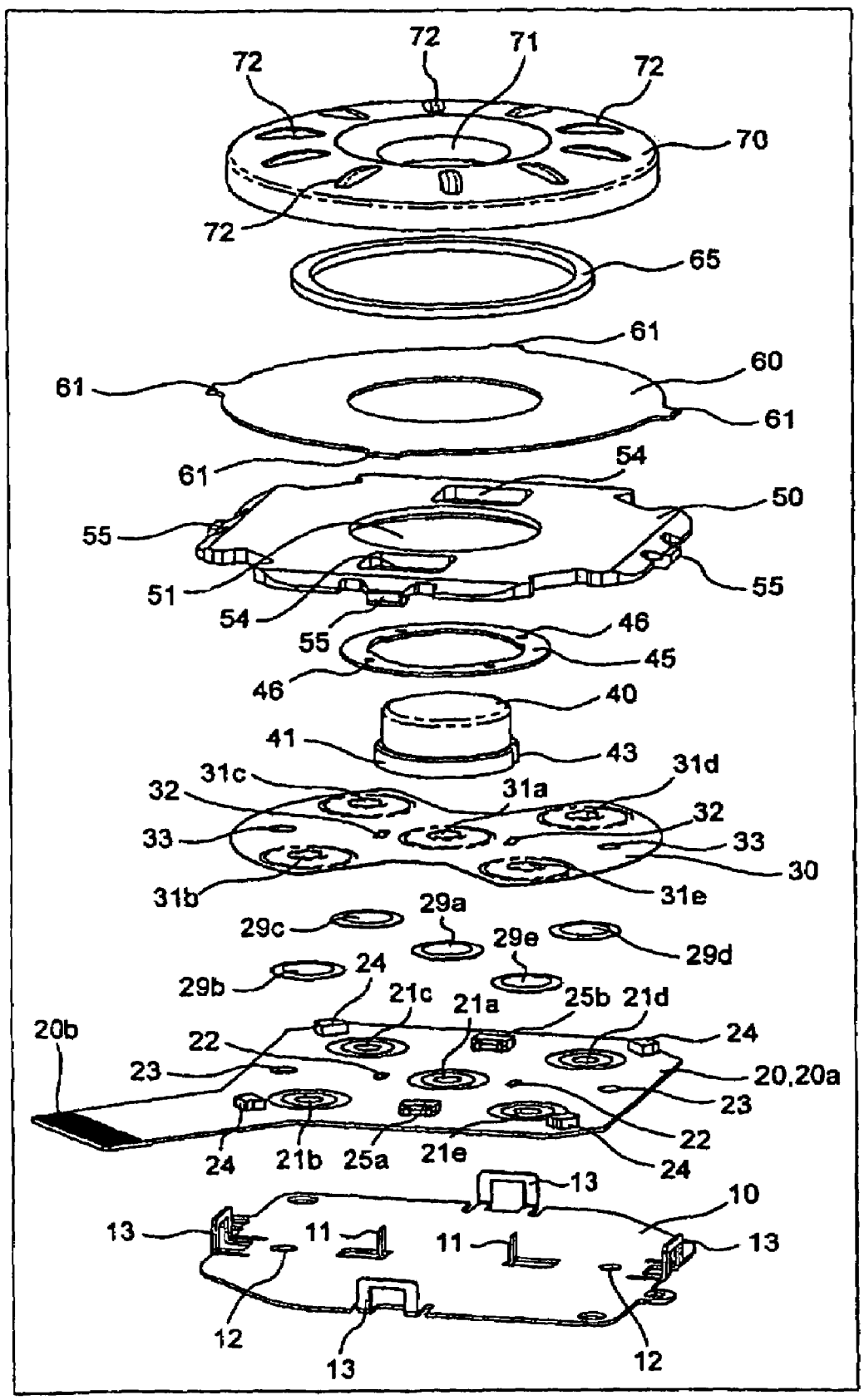
FIG. 4 is an exploded perspective view in which the operation input device shown in FIG. 2A is seen from above.
Figure 5:
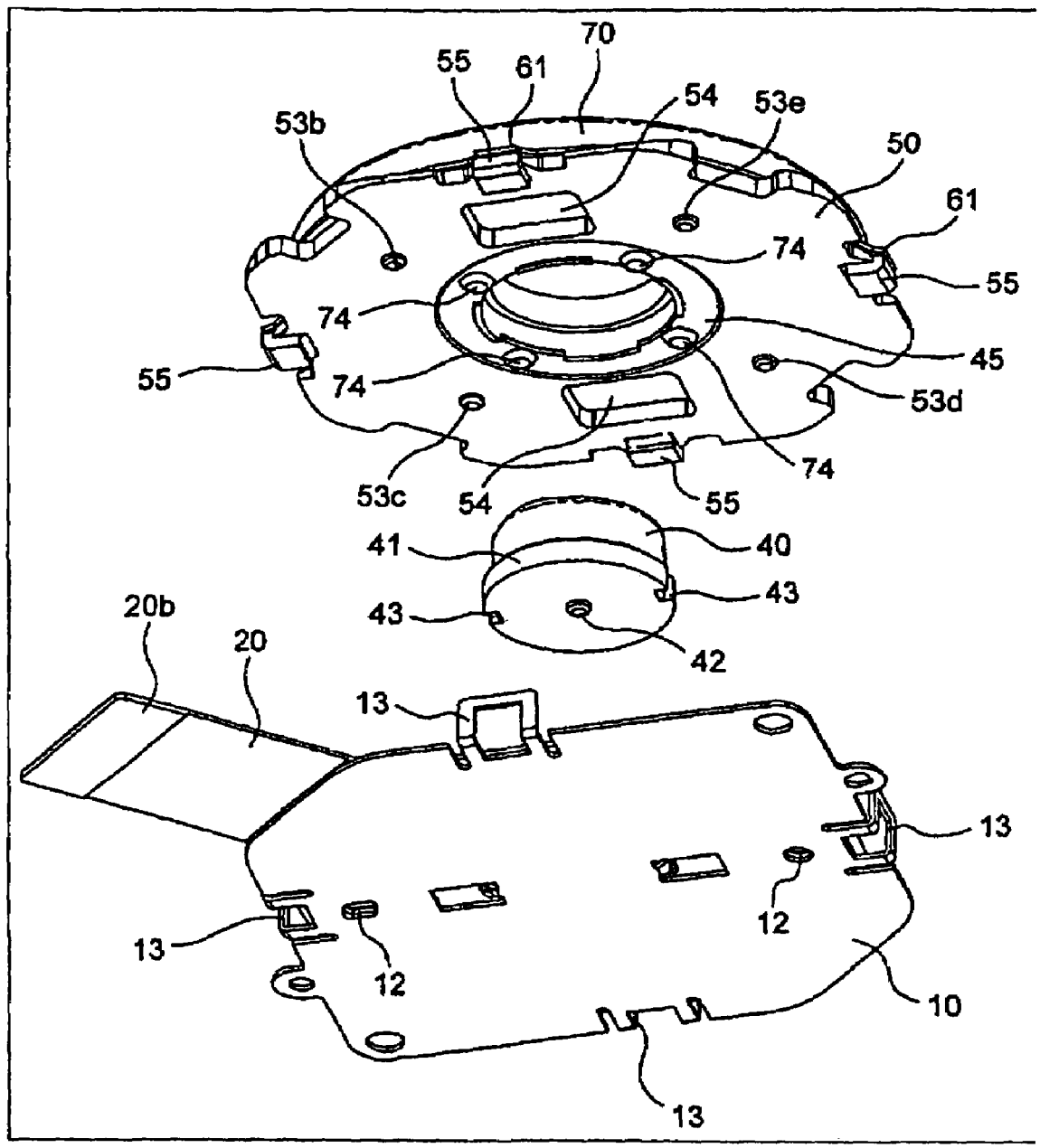
FIG. 5 is an exploded perspective view in which parts of the operation input device shown in FIG. 2B are disassembled and seen from below.
Figure 6:
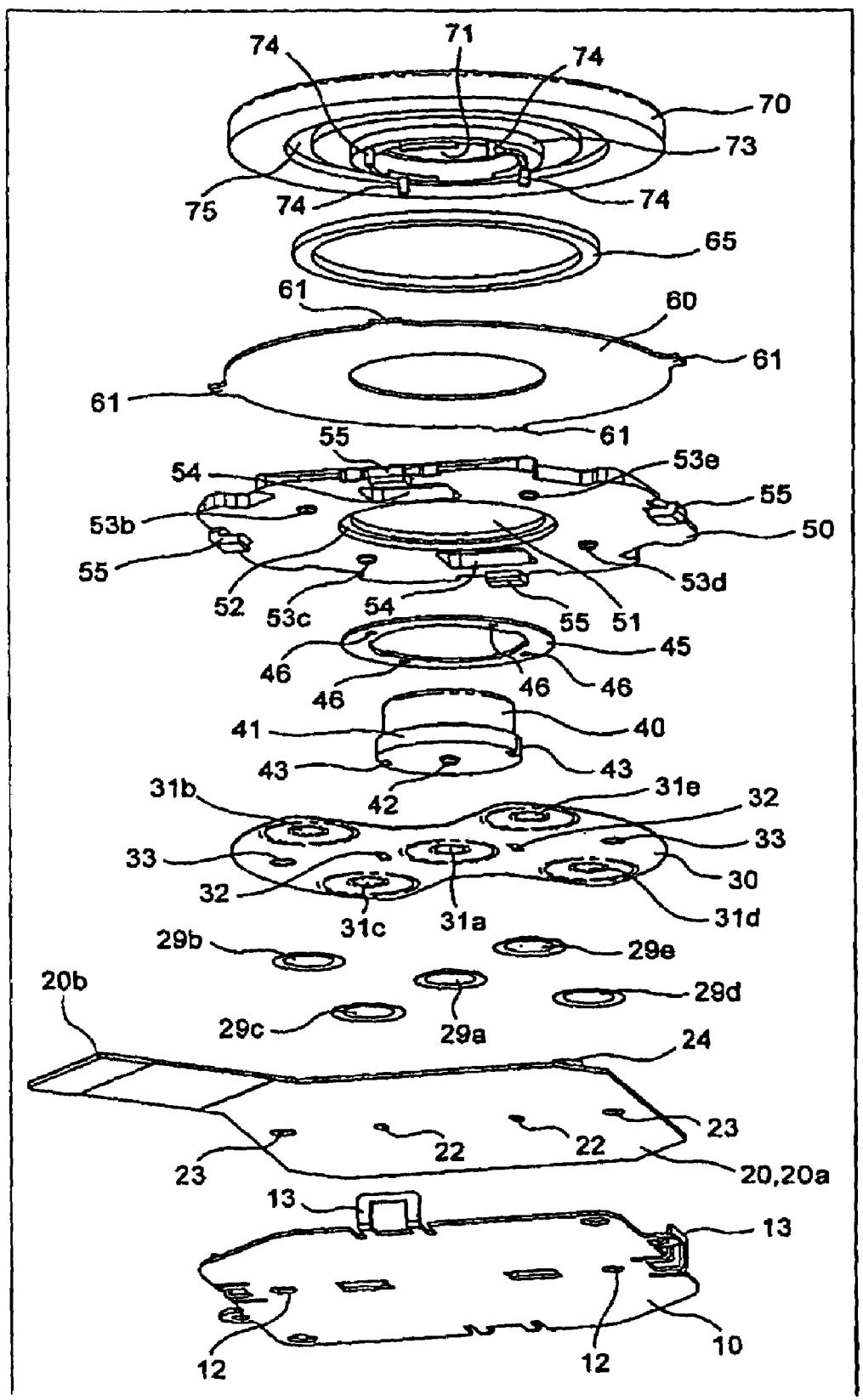
FIG. 6 is an exploded perspective view in which the operation input device shown in FIG. 2B is seen from below.
Figure 7:
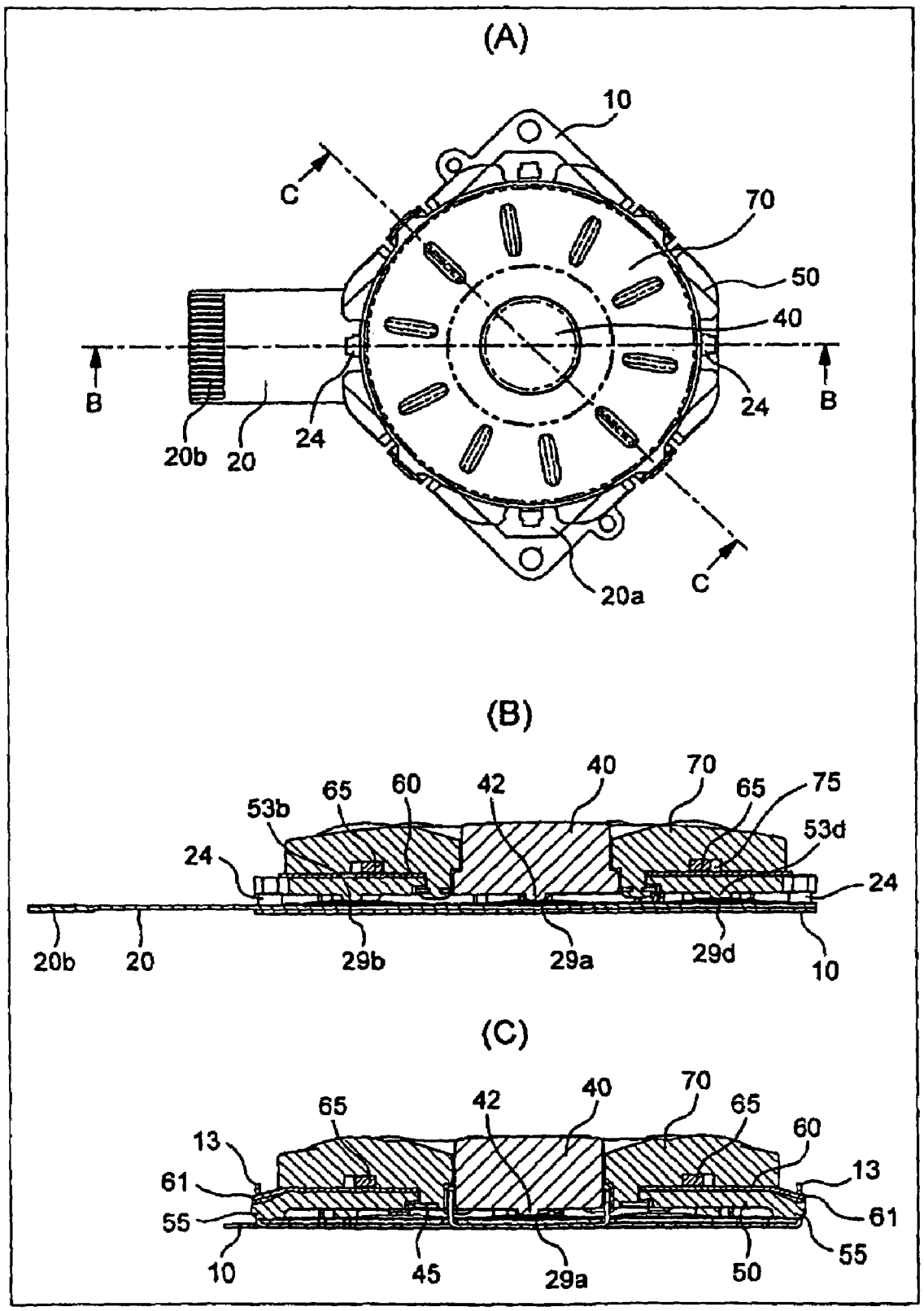
FIGS. 7A, 7B and 7C are a front view of the operation input device shown in FIG. 1, and sectional views taken along a line B-B and a line C-C indicated in FIG. 7A, respectively.
Figure 8:
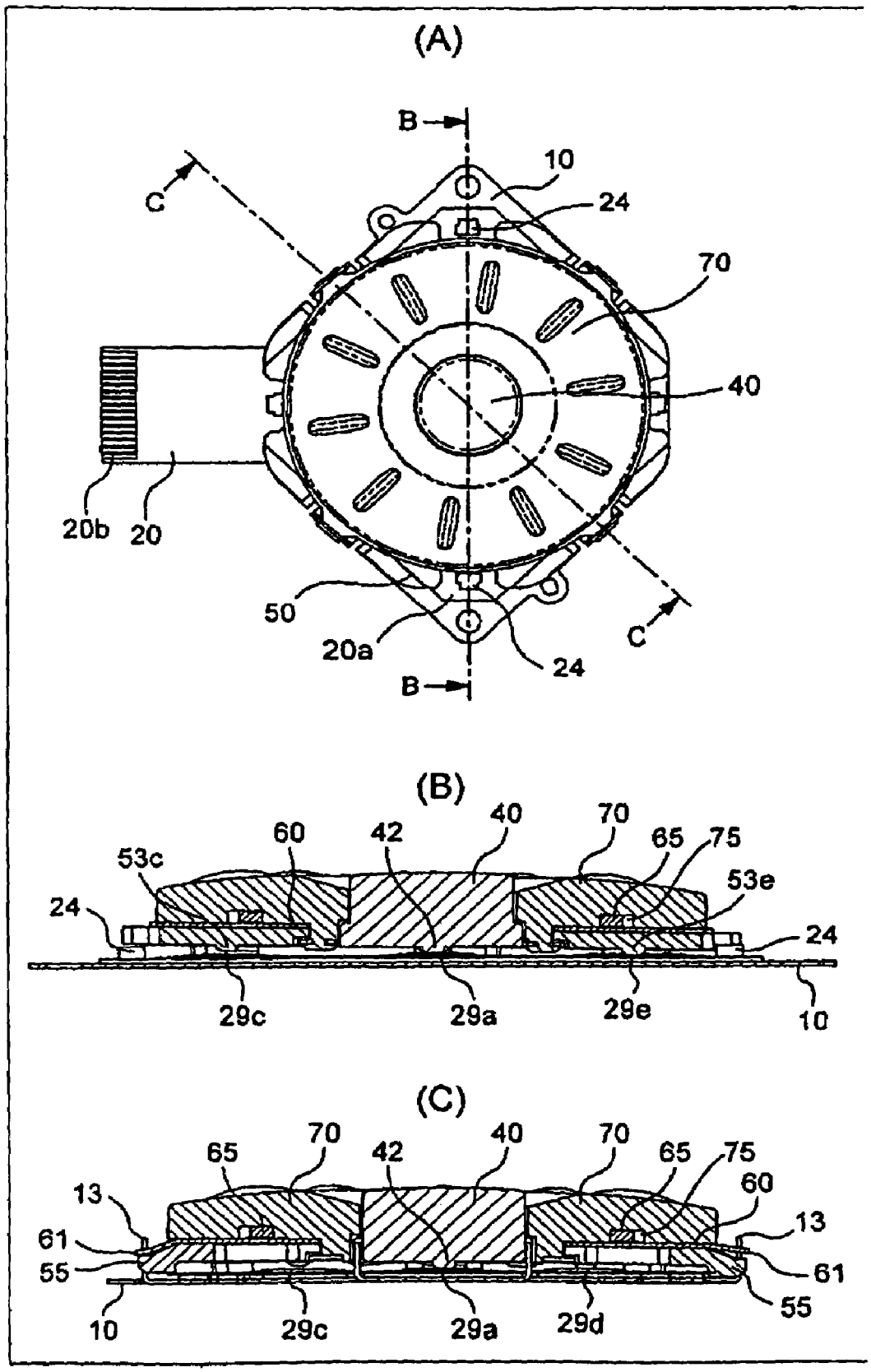
FIGS. 8A, 8B and 8C are a front view of the operation input device shown in FIG. 1, and sectional views taken along a line B-B and a line C-C indicated in FIG. 8A, respectively.
Figure 9:
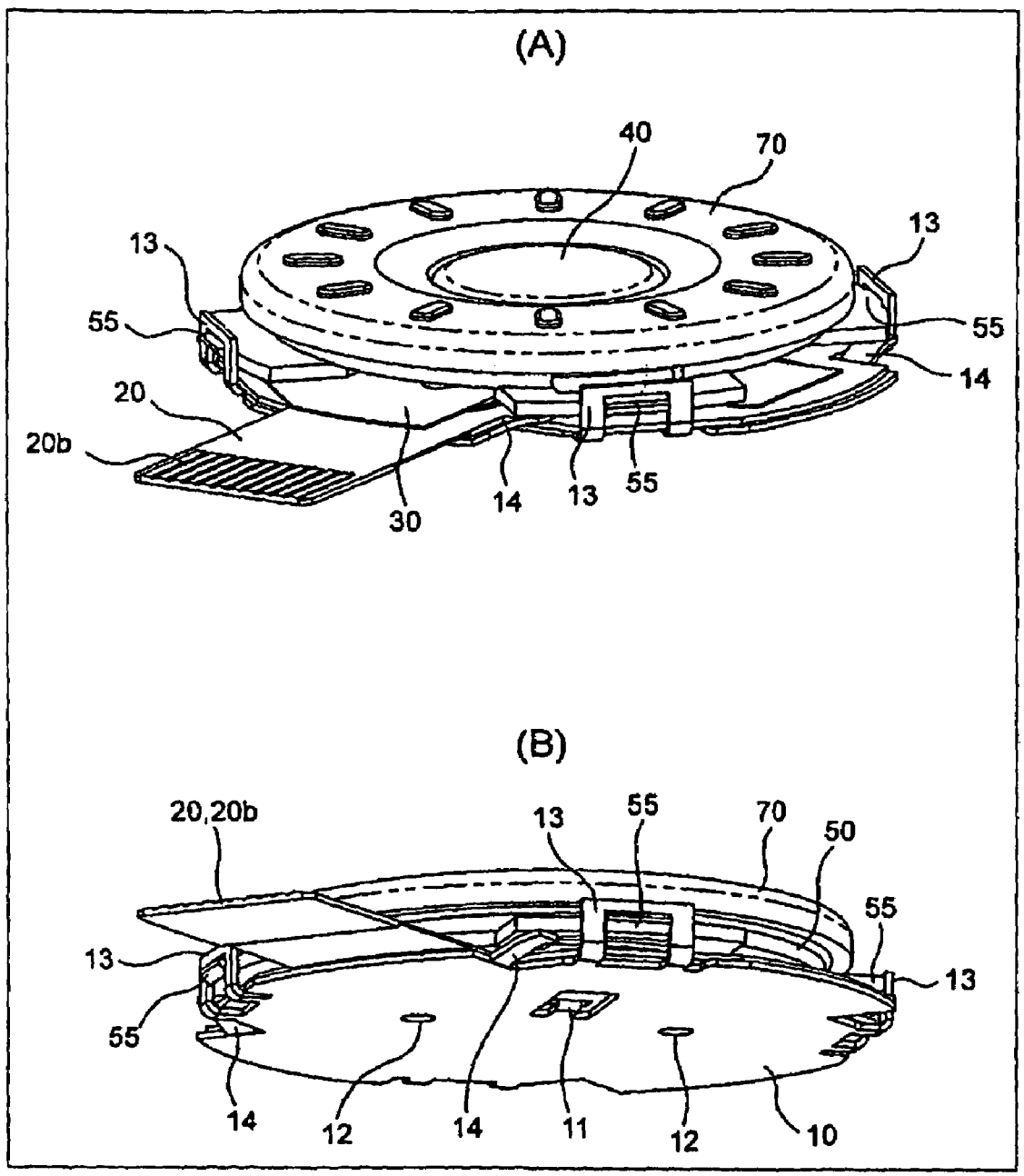
FIGS. 9A and 9B are perspective views in which the second embodiment of the operation input device according to the invention is seen from above and from below, respectively.
Figure 10:
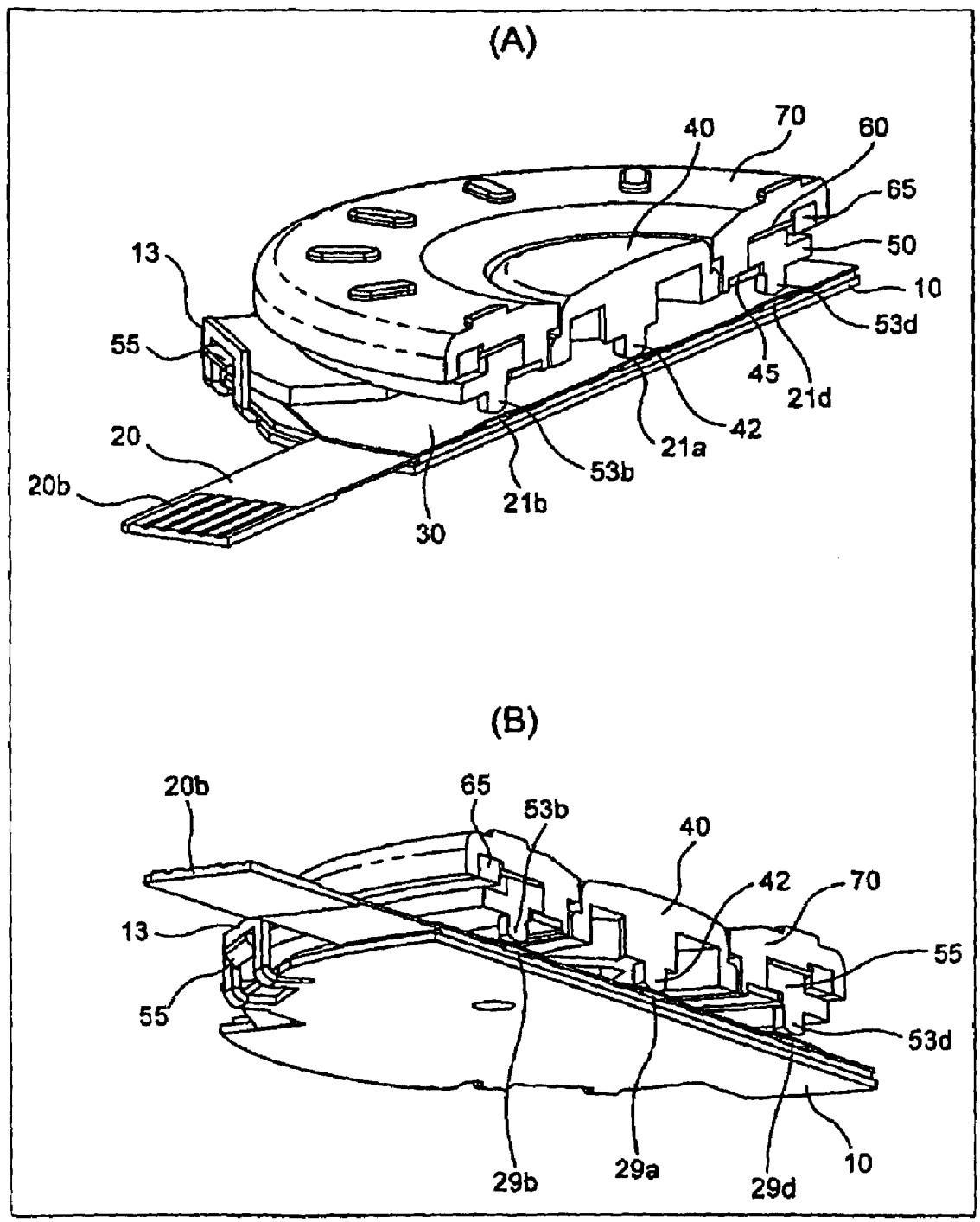
FIGS. 10A and 10B are sectional views which correspond to the perspective views shown in FIGS. 9A and 9B, respectively.
Figure 11:
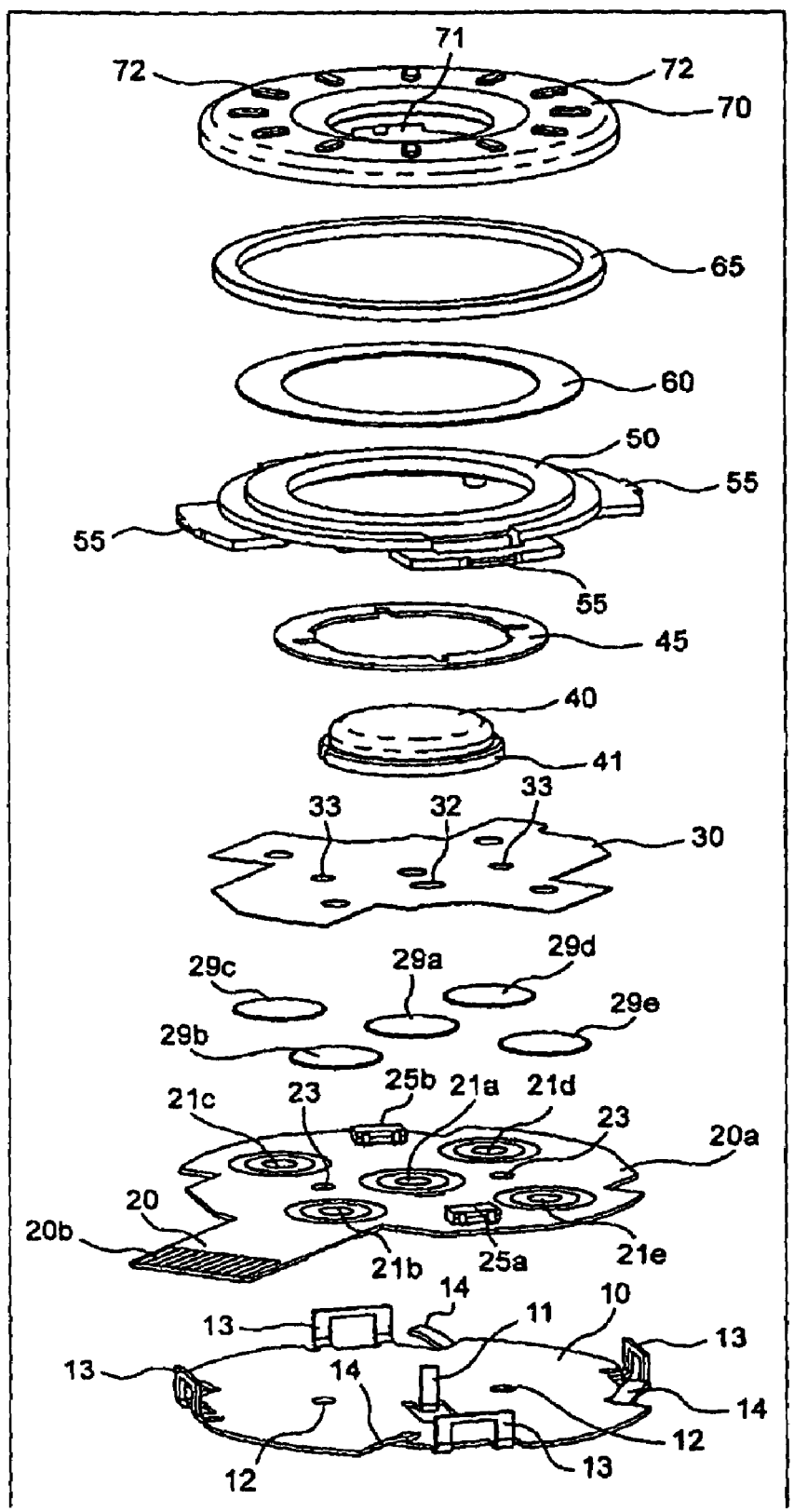
FIG. 11 is an exploded perspective view in which the operation input device shown in FIG. 9A is seen from above.
Figure 12:
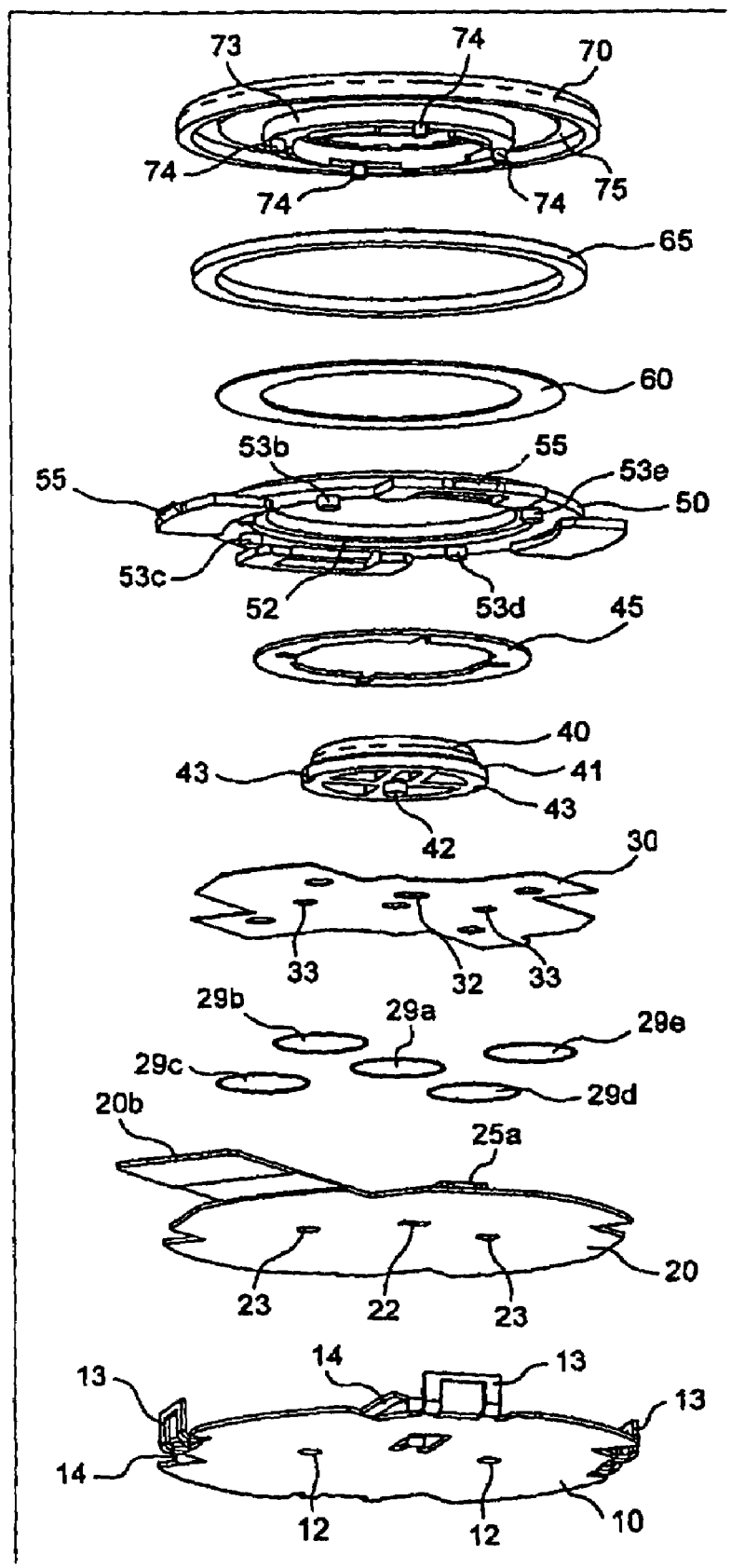
FIG. 12 is an exploded perspective view in which the operation input device shown in FIG. 9B is seen from below.
Figure 13:
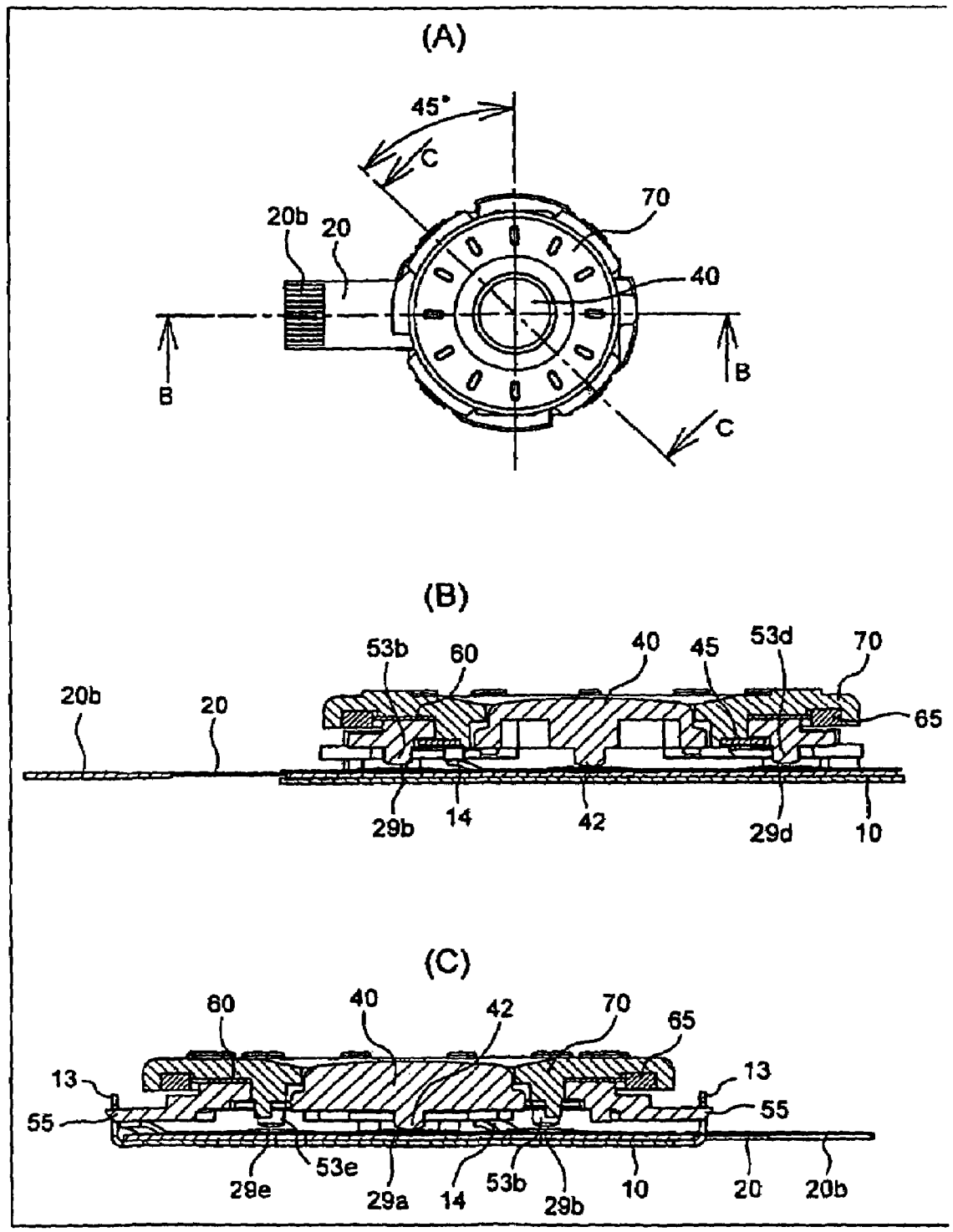
FIGS. 13A, 13B and 13C are a front view of the operation input device shown in FIGS. 9A and 9B, and sectional views taken along a line B-B and a line C-C indicated in FIG. 13A, respectively.
Figure 14:
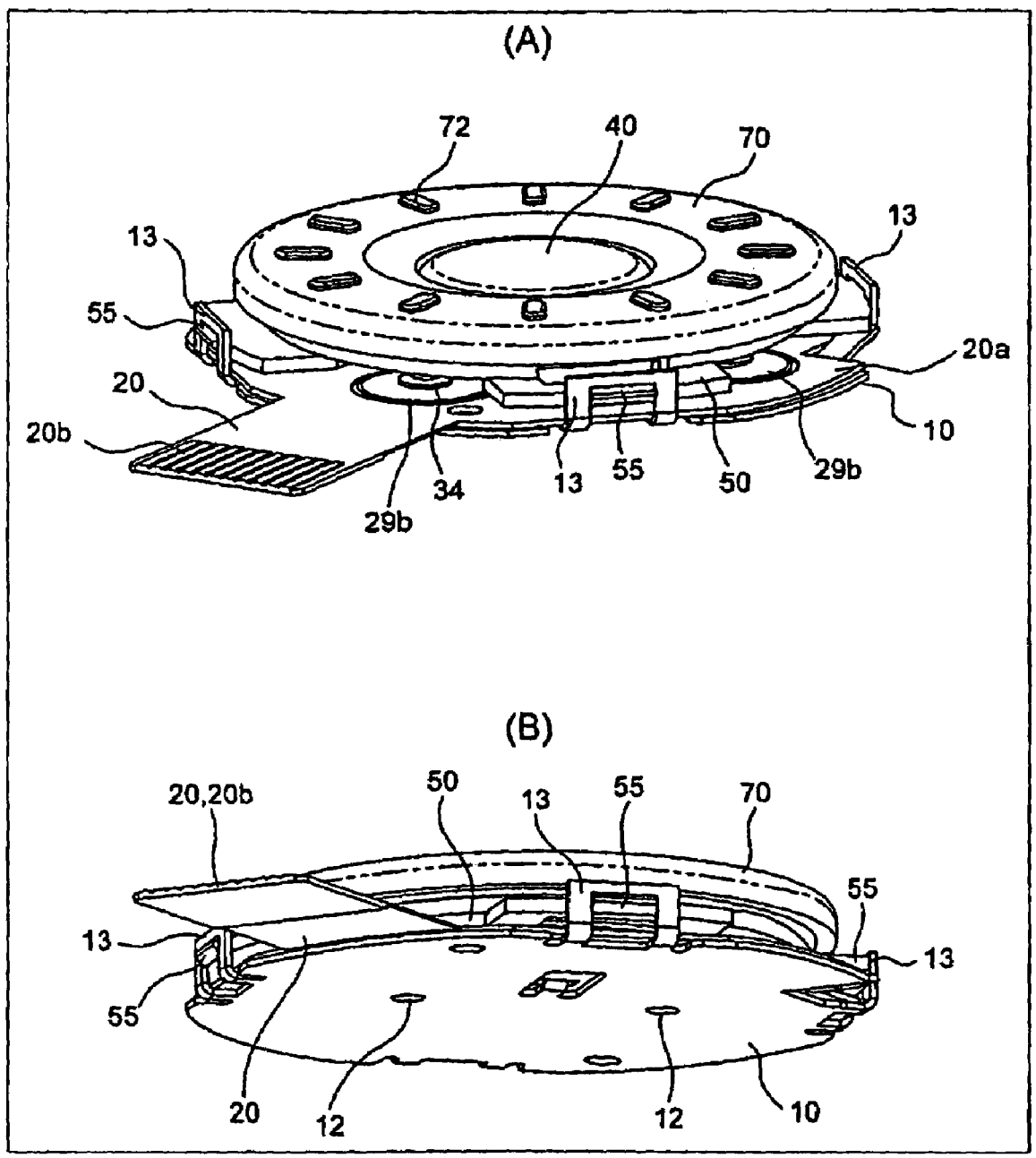
FIGS. 14A and 14B are perspective views in which the third embodiment of the operation input device according to the invention is seen from above and from below, respectively.
Figure 15:
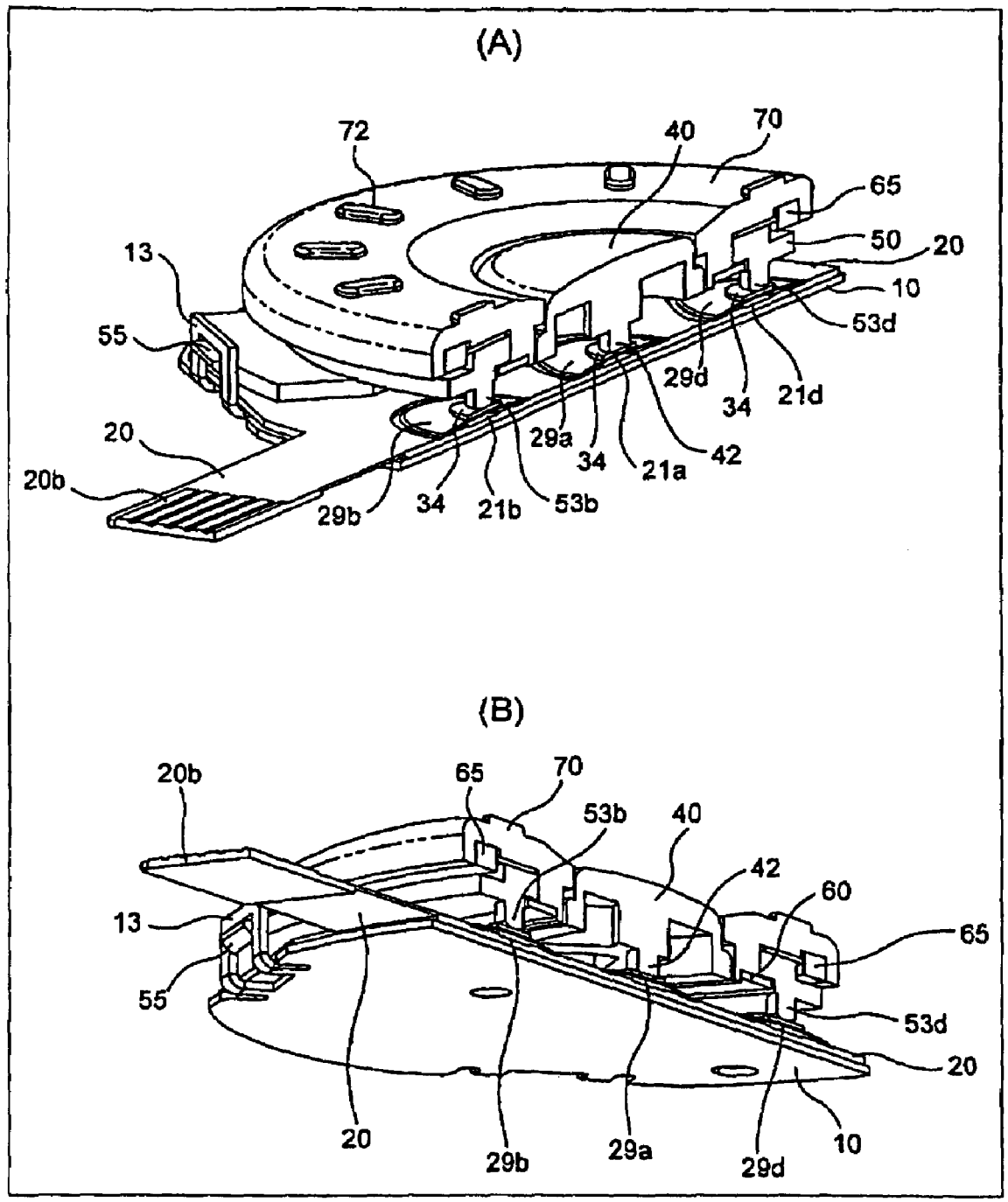
FIGS. 15A and 15B are sectional views which correspond to the perspective views shown in FIGS. 14A and 14B, respectively.
Figure 16:
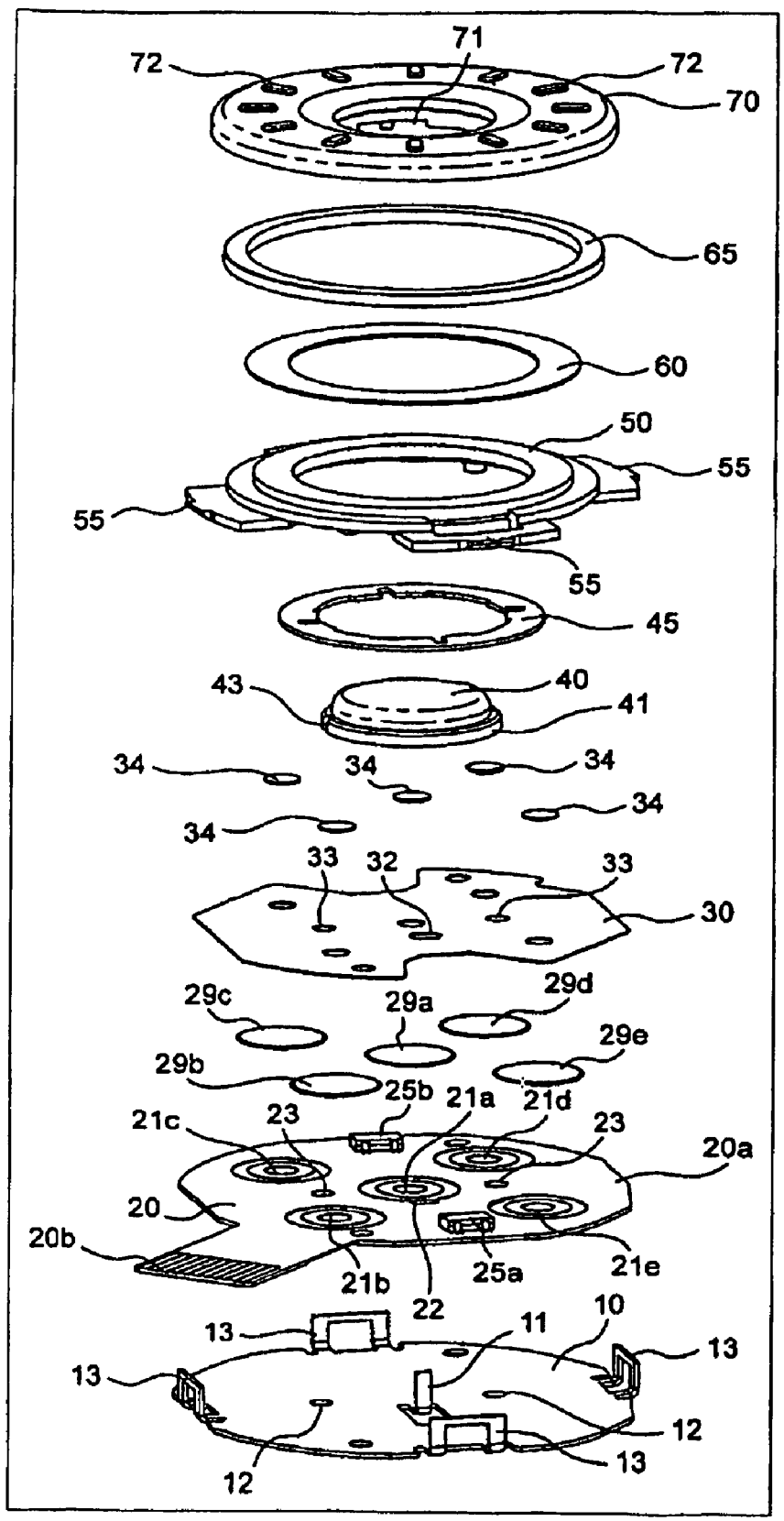
FIG. 16 is an exploded perspective view in which the operation input device shown in FIG. 14A is seen from above.
Figure 17:
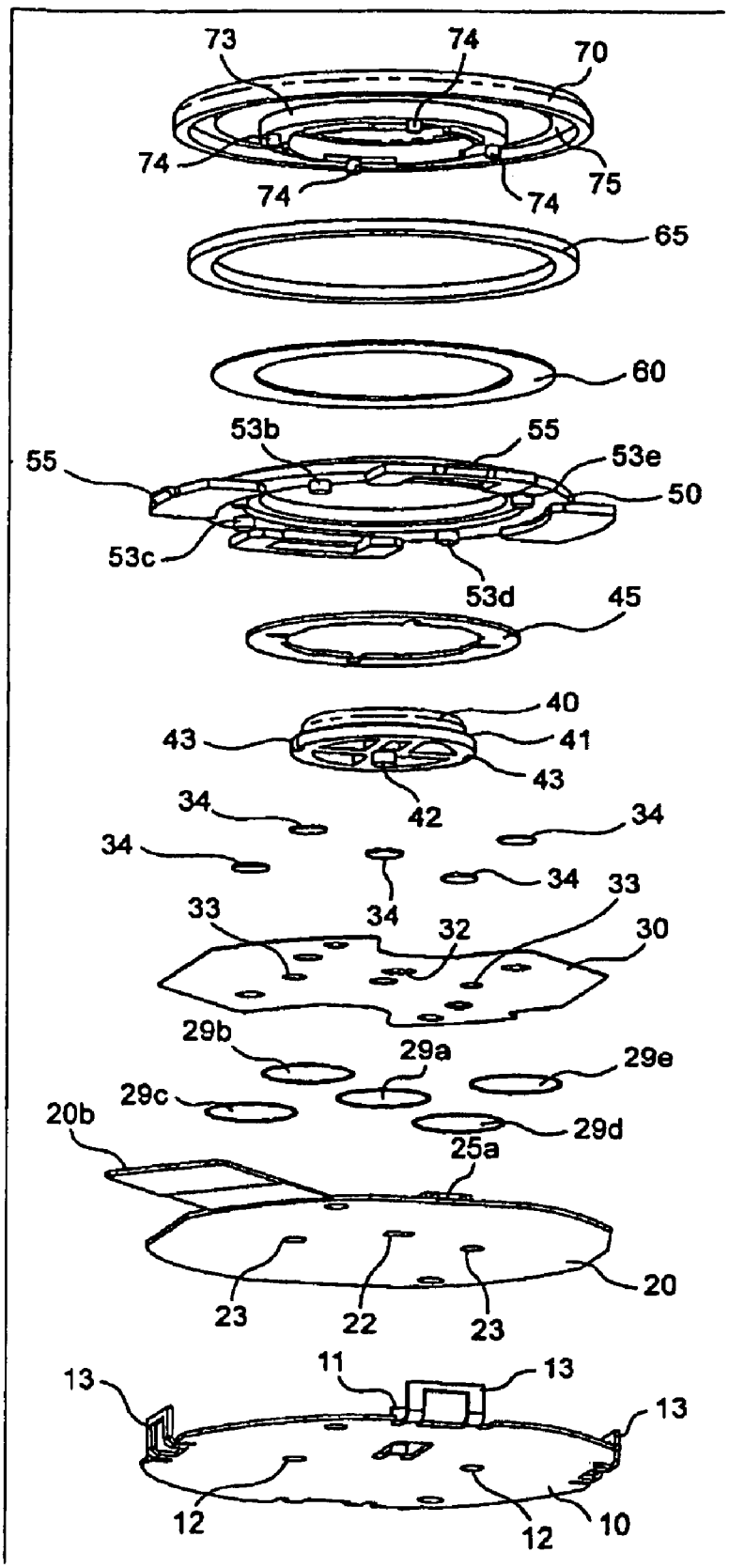
FIG. 17 is an exploded perspective view in which the operation input device shown in FIG. 14B is seen from below.

As shown in FIGS. 4 and 6, the operation input device 3 includes a metal base 10 on and with which a flexible printed circuit board 20 is stuck and united, a resin-made film cover 30 which has a center pushbutton switch 29a and four pushbutton switches 29b-29e stuck on its underside beforehand, the pushbutton 40 which operates the center pushbutton switch 29a, an operation plate 50 which is supported on the metal base 10, a slide sheet 60 which is placed on the upside of the operation plate 50, and an operation dial 70 which has an annular magnet 65 fitted and fixed and has a fixation ring 45 clinched and fixed on its underside and which is turnably mounted on the operation plate 50.

As shown in FIG. 4, the metal base 10 is substantially rectangular in plan, and it has a pair of positioning pillars 11, 11 cut and erected at its central parts and is provided with jig holes 12, 12 outside the respective positioning pillars. Besides, the metal base 10 has elastic engagement receivers 13 cut and erected centrally of the edges of its respective latera.

The printed circuit board 20 made of a flexible resin film is formed of a circuit board body 20a of substantially rectangular shape, whose rear surface is coated with a bonding material and is clad with peeling paper, and a lead portion 20b which extends from the circuit board body 20a. Here, the circuit board body 20a is centrally provided with a concentric conductive portion 21a, and it has concentric conductive portions 21b, 21c, 21d, 21e arranged crosswise about the conductive portion 21a thereon. Besides, the printed circuit board 20 is provided with positioning holes 22 and jig holes 23 at positions which correspond respectively to the positioning pillars 11 and jig holes 12 of the metal base 10. Further, LEDs 24 for notifying an operating state are mounted on the respective corner parts of the circuit board body 20a, and a pair of Hall elements 25a, 25b are mounted on this circuit board body 20a so as to oppose to each other with the conductive portion 21a interposed therebetween.

Incidentally, the conductive portions 21a-21e are not restricted to only the concentric ones. Each of these conductive portions may well be, for example, such that one conductive portion which is substantially C-shaped in plan has the other conductive portion arranged centrally so as to be led out.

The resin-made film cover 30 has a planar shape in which this film cover can be mounted on the circuit board body 20a. This resin-made film cover 30 is provided with sticking portions 31a-31e at those positions of its rear surface coated with a bonding material which correspond to the respective conductive portions 21a-21e. Flat dome-shaped inversion springs which form the pushbutton switches 29a-29e, are respectively stuck to the sticking portions 31a-31e. Further, the resin-made film cover 30 is provided with positioning holes 32 and jig holes 33 at positions which correspond respectively to the positioning pillars 11 and jig holes 12 of the metal base 10.

The pushbutton 40 has an outer peripheral shape in which this pushbutton can be inserted into the operation hole 71 of the operation dial 70 to be stated later. A coming-off preventive annular rib 41 is unitarily molded at the edge part of the lower end of the outer periphery of the pushbutton 40. Besides, the pushbutton 40 is protrusively provided with a depressing lug 42 (FIG. 6) centrally of its bottom surface, and it is formed with guiding slits 43 which engage the respective positioning pillars 11 of the metal base 10, in the outer peripheral surface of the annular rib 41.

The fixation ring 45 is clinched and fixed onto the underside of the operation dial 70 to be stated later, thereby to turnably assemble the operation dial 70 to the operation plate 50.

The operation plate 50 is a resin-molded article which is substantially rectangular in plan, and which can cover the metal base 10. This operation plate 50 is centrally provided with a fitting hole 51, and it is formed with an annular step 52 at the peripheral edge part of the underside of the fitting hole 51 (FIG. 6). Besides, the operation plate 50 is protrusively provided with depressing lugs 53b-53e at positions which correspond to the respective sticking portions 31b-31e of the resin-made film cover 30. Further, the operation plate 50 is provided with rectangular holes 54 at positions which correspond to the respective Hall elements 25a, 25b, and it is provided with elastic pawls 55 centrally of the edge parts of the respective latera in a manner to protrude sideward. Incidentally, the rectangular holes 54 are provided in order to facilitate the passages of magnetic fluxes.

The slide sheet 60 has a concentric circular shape in which this slide sheet can cover the upside of the operation plate 50, and it is provided with elastic tongues 61 which engage the respective elastic engagement receivers 13 of the metal base 10, at its outer peripheral edge parts.

The annular magnet 65 has N-poles and S-poles arranged alternately, and it is fitted and fixed into the annular groove 75 of the operation dial 70 to be stated later. In particular, according to this embodiment, the annular magnet 65 is embedded in the annular groove 75 of the operation dial 70, and it does not lie in direct touch with the slide sheet 60. This brings forth the advantage that the operation input device 3 of thin type in which a frictional resistance acting on the operation dial 70 is low and which can be smoothly operated is obtained.

The operation dial 70 is centrally provided with the operation hole 71 into which the pushbutton 40 is fitted, and it is provided with antiskid raises 72 at the peripheral parts of its upside in a manner to extend radially and to lie at equal pitches. Besides, as shown in FIG. 6, the operation dial 70 is concentrically provided with an annular protrusion 73 for clinching and fixing the fixation ring 45, at the peripheral edge part of the underside of the operation hole 71, and it is protrusively provided with clinching projections 74 on the lower surface of the annular projection 73. Further, the operation dial 70 is concentrically provided with the annular groove 75 for fitting and fixing the annular magnet 65 thereinto, outside the annular protrusion 73. Incidentally, the disc type operation dial 70 need not always be circular, but it may well be in the shape of, for example, an equilateral octagon as long as it is turnable.

Next, there will be described a process for assembling the constituent components stated above.

First, the jig holes 12 of the metal base 10 are respectively set to one pair of positioning pins of a jig not shown, thereby to position this metal base 10. Subsequently, the jig holes 23 and positioning holes 22 of the printed circuit board 20 on which the Hall elements 25a, 25b and the LEDs 24 are mounted at their predetermined positions are respectively set to the pair of pins of the jig and the positioning pillars 11 of the metal base 10, thereby to stick and unite the printed circuit board 20 to and with the metal base 10. Further, the dome-shaped inversion springs to become the pushbutton switches 29a-29e are respectively stuck and united to and with the sticking portions 31a-31e of the resin-made film cover 30. Besides, the jig holes 33 and positioning holes 32 of the resin-made film cover 30 are respectively set to the pair of positioning pins of the jig and the positioning pillars 11 of the metal base 10, whereby the resin film 30 is stuck and united to and with the printed circuit board 20, and the pushbutton switches 29a-29e made up of the inversion springs stuck to the resin film 30 are formed.

On the other hand, the annular magnet 65 is fitted into the annular groove 75 of the operation dial 70 and is bonded and fixed thereto. Besides, the slide sheet 60 is positioned onto the upside of the operation plate 50, and the annular protrusion 73 of the operation dial 70 is fitted into the fitting hole 51. Further, the fixation fitting 45 is positioned to the annular protrusion 73 of the operation dial 70, and the clinching projections 74 of the annular protrusion 73 are inserted into the clinching holes 46 of the fixation fitting 45 and are clinched. Thus, the operation plate 50 and the slide sheet 60 are held between the operation dial 70 and the fixation ring 45, and the operation dial 70 is turnably supported on the operation plate 50 through the slide sheet 60.

Figure 3:
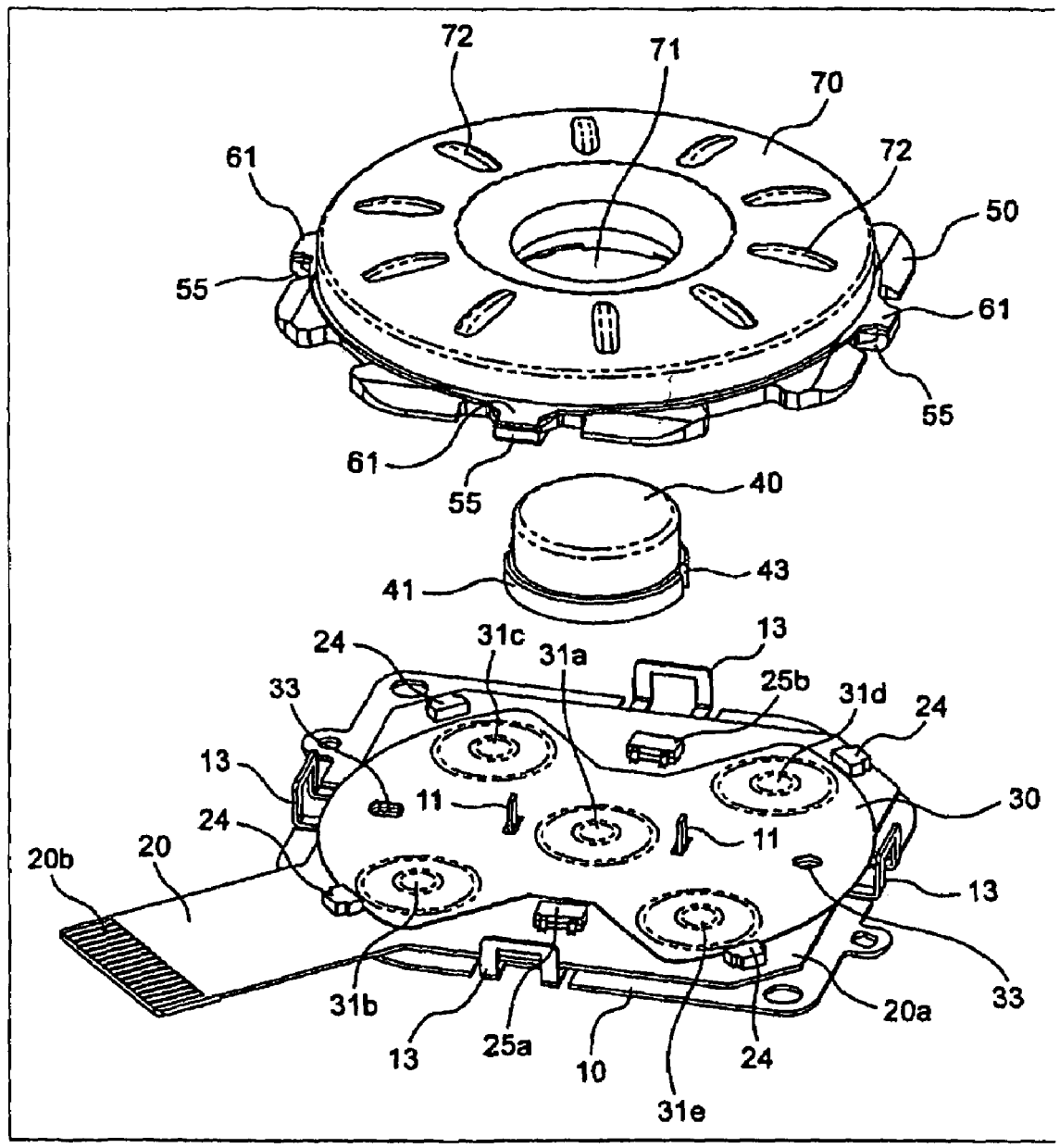
FIG. 3 is an exploded perspective view in which parts of the operation input device shown in FIG. 2A are disassembled and seen from above.

Besides, as shown in FIG. 3, the pushbutton 40 is positioned over the pushbutton switch 29a of the printed circuit board 20. Further, the pushbutton 40 is fitted into the fitting hole 71 of the operation dial 70, and the elastic pawls 55 of the operation plate 50 and the elastic tongues 61 of the slide sheet 60 are engaged with the elastic engagement receivers 13 of the metal base 10, whereby the assembling operations are completed. Here, the elastic tongues 61 of the slide sheet 60 are engaged with the elastic engagement receivers 13 in a state where they are somewhat bent downward, so as to generate urging forces.

According to this embodiment, the operation plate 50 is unturnably fixed to the base 10, and the operation dial 70 is depressed, thereby to bear the depression operation function of depressing the pushbutton switches 29a-29e. On the other hand, the operation dial 70 turnably assembled onto the upside of the operation plate 50 is turned, thereby to bear a turning operation function.

Thus, according to this embodiment, the elastic pawls 55 of the operation plate 50 are held in engagement with the elastic engagement receivers 13 of the base 10, so that the operation plate 50 can be prevented from becoming rickety in a horizontal direction.

Moreover, the operation plate 50 is urged upwards by the spring forces of the pushbutton switches, so that it undergoes no ricketiness in a vertical direction.

Furthermore, the elastic tongues 61 of the slide sheet 60 are held in engagement with the elastic engagement receivers 13, thereby to urge the operation plate 50 downwards, so that the vertical ricketiness of the operation plate 50 can be prevented more reliably. Besides, the slide sheet 60 urges the operation dial 70 also upwards. Therefore, the operation dial 70 can be restrained from excessively turning due to an inertial force, to bring forth the advantage that any erroneous operation is difficult to occur.

Incidentally, the operation plate 50 and the operation dial 70 may well be supported in such a way that only the elastic tongues 61 of the slide sheet 60 arranged between the operation plate 50 and the operation dial 70 are engaged with the elastic engagement receivers 13 of the base 10.

Next, there will be described an operation method for the operation input device 3 of the above configuration.

When the operation dial 70 is turned, thereby to turn the annular magnet 65 unitarily with this operation dial, the changes of a magnetic field are respectively sensed by the pair of Hall ICs 25a, 25b, and a turning direction and a turning magnitude are detected on the basis of the sensed changes.

Besides, the results of the detections are reflected as the movement of the scroll bar on the screen display of the monitor 2 through a control circuit not shown. Subsequently, in a case where the scroll bar has arrived at a desired position, the pushbutton 40 is depressed, whereby the center pushbutton switch 29a is operated by the depressing lug 42 so as to output a selection command.

Alternatively, the peripheral part of the operation dial 70 as corresponds to, for example, the depressing lug 53e shown in FIG. 8B may well be depressed, thereby to invert and turn ON the inversion spring of the pushbutton switch 29e lying directly under the depressing lug 53e.

As shown in FIG. 9A through FIG. 13C, the second embodiment of the invention corresponds to a case where an operation plate 50 is urged upwards by elastic arms 14 which are cut and raised from the peripheral edge parts of a metal base 10, thereby to prevent the operation plate 50 from becoming rickety in a vertical direction. The same parts as in the first embodiment are assigned the same reference numerals and signs, and they shall be omitted from description.

According to the second embodiment, the operation plate 50 is pushed upwards, so that superfluous loads do not act on pushbutton switches 29a-29e, and any maloperation can be prevented. Moreover, since elastic arms being separate members are not required, the number of components and the number of assembling man-hour are small, and an operation input device of high productivity is obtained.

As shown in FIG. 14A through FIG. 17, the third embodiment of the invention corresponds to a case where elastic pads 34 are respectively placed on pushbutton switches 21a-21e through a resin-made film cover 30. Incidentally, the same parts as in the first embodiment are assigned the same reference numerals and signs, and they shall be omitted from description. For the brevity of illustration, however, the resin-made film cover 30 is not shown in FIGS. 14A through 15C.

According to the third embodiment, the elastic pads 34 are placed so as to push an operation plate 50 upwards, whereby the operation plate 50 can be prevented from becoming rickety in a vertical direction. Especially, since the elastic pads 34 can absorb a cumulative error ascribable to the assemblage of a large number of components, a high assemblage precision is not required, and an operation input device easy of fabrication is obtained.

Figure 18:
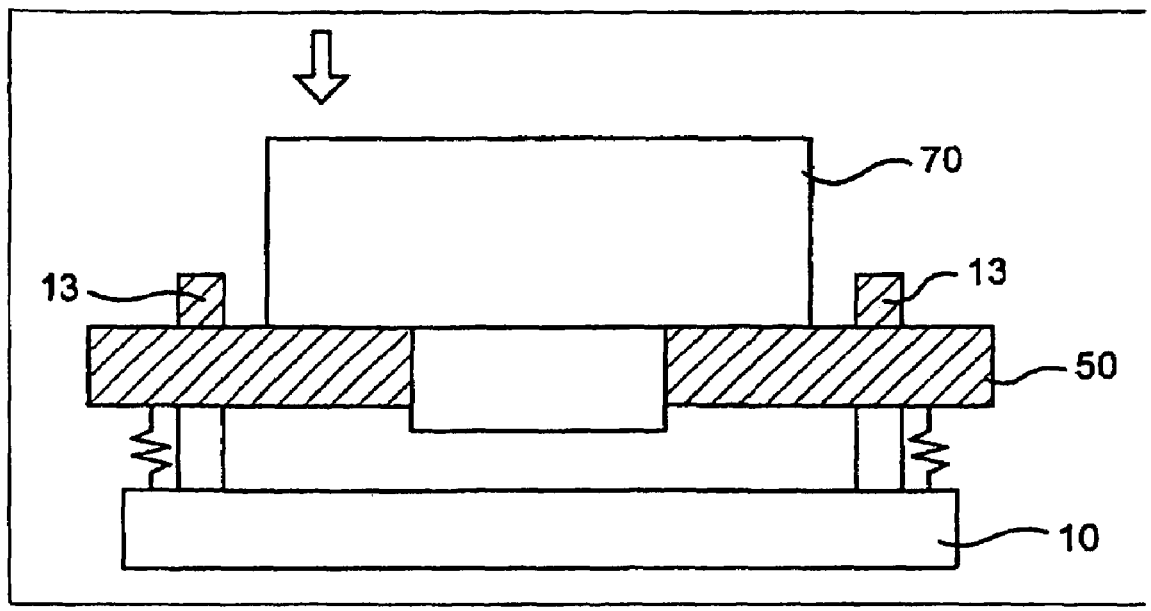
FIG. 18 is a schematic sectional view showing the operating principle of the operation input device according to the invention.
Figure 19:
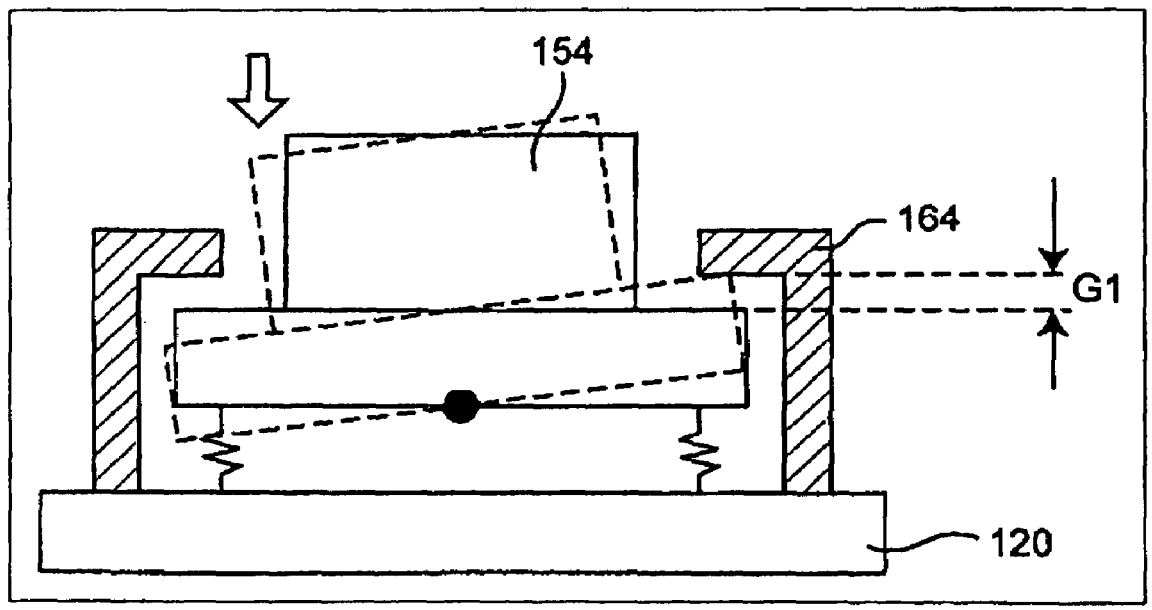
FIG. 19 is schematic sectional views showing the operating principle of an operation input device in a prior-art example.

Incidentally, FIG. 18 illustrates the principle stated above. Elastic members urging the operation plate 50 in the figure correspond to the slide sheet 60, elastic arms 14 and elastic pads 34 in the respective embodiments stated above.

Besides, the ricketiness may well be prevented in such a way that the elastic pads are arranged between the upside of the printed circuit board 20 and the underside of the operation plate 50 so as to urge this operation plate 50 upwards.

It is a matter of course that the operation input device according to the invention is not restricted to the portable telephone, but that it may well be applied to another mobile equipment or any other electronic equipment.

What is claimed is:

1. An operation input device comprising:
   a base,
   a printed circuit board which has a plurality of pushbutton switches and magnetic field detecting elements mounted on its upside and which is stacked on and united with said base,
   an operation plate which is arranged on said printed circuit board and whose outer peripheral edge parts are supported by said base,
   a disc type operation dial in which an annular magnet with N-poles and S-poles arranged alternately is assembled on an underside of said operation dial and which is turnably assembled on an upside of said operation plate,
   a slide sheet which is arranged between said operation plate and said disc type operation dial and whose outer peripheral edge parts are supported by said base, and
   a member operable to vertically urge said operation plate;
   wherein each outer peripheral edge part of said operation plate and each outer peripheral edge part of said slide sheet are engaged together with an corresponding outer peripheral edge part of said base and supported by said base so as to be vertically movable in a preset range and so as not to be displaced in a rotational direction; and
   wherein said disc type operation dial is turned, thereby to sense changes of magnetic fluxes of the annular magnet by the magnetic field detecting elements and to detect a turning direction, while said disc type operation dial is depressed, thereby to operate any of the pushbutton switches through said operation plate.

2. The operation input device according to claim 1, wherein said operation plate has its underside pushed up by elastic arms cut and raised from said base, thereby to be urged upwards.

3. The operation input device according to claim 1, wherein elastic pads are arranged between the pushbutton switches and said operation plate.

4. The electronic equipment comprising an operation input device according to claim 1, which is mounted with said disc type operation dial exposed so as to be operable from outside.

5. The operation input device according to claim 1, wherein said operation plate has its underside pushed up by elastic arms cut and raised from said base, thereby to be urged upwards.

6. An electronic equipment comprising the operation input device according to claim 1, which is mounted with said disc type operation dial exposed so as to be operable from outside.

7. An electronic equipment comprising the operation input device according to claim 3, which is mounted with said disc type operation dial exposed so as to be operable from outside.

8. The operation input device according to claim 1, wherein the member operable of vertically urge said operation plate is integral with the base.

* * * * *